United States Patent [19]
Mortell

[11] 3,718,552
[45] Feb. 27, 1973

[54] METHOD AND APPARATUS FOR ELECTROLYTICALLY RECOVERING METALS

[76] Inventor: Charles H. Mortell, 6929 South Main Street, Rockford, Ill.

[22] Filed: Dec. 21, 1970

[21] Appl. No.: 99,784

[52] U.S. Cl..............204/105 R, 204/109, 204/271, 204/272, 204/273, 204/275, 204/278
[51] Int. Cl..........C22d 1/00, C22d 1/02, C23b 5/68
[58] Field of Search......204/271, 273, 272, 275, 233, 204/278, 143 R, 105, 109, 114

[56] References Cited

UNITED STATES PATENTS

| | | | |
|---|---|---|---|
| 3,560,366 | 2/1971 | Fisher | 204/109 |
| 3,072,577 | 1/1963 | Mandroian | 204/109 |

*Primary Examiner*—John H. Mack
*Assistant Examiner*—R. L. Andrew
*Attorney*—Wolfe, Hubbard, Leydig, Voit & Osann

[57] ABSTRACT

A depositer for electrolytically recovering metal from the bed of a body of water includes a submersible housing with a closed top end and an open bottom end and is operable to lodge by walls defining the sides of the housing within the bed to form a closed chamber containing a portion of the bed and water. The housing serves as the anode of the depositor and is electrically connected with an energy source for supplying direct current thereto. A plurality of rods depending from the top end extend into the chamber, serve as the cathodes, and are also connected with the energy source. Mounted on the inside wall of the chamber are a plurality of sieves adapted to hold a dissolvable chemical used to increase the conductivity of water captured in the chamber. A pump agitator suspended from the top and positioned within the chamber draws material from the bed and circulates it within the chamber to thoroughly mix the chemical with the captured water and bed to more readily ionize the metal to be recovered. As a suitable electric potential is applied between the anode and cathodes, the ionized metal confined within the chamber deposits upon the cathode rods.

9 Claims, 5 Drawing Figures

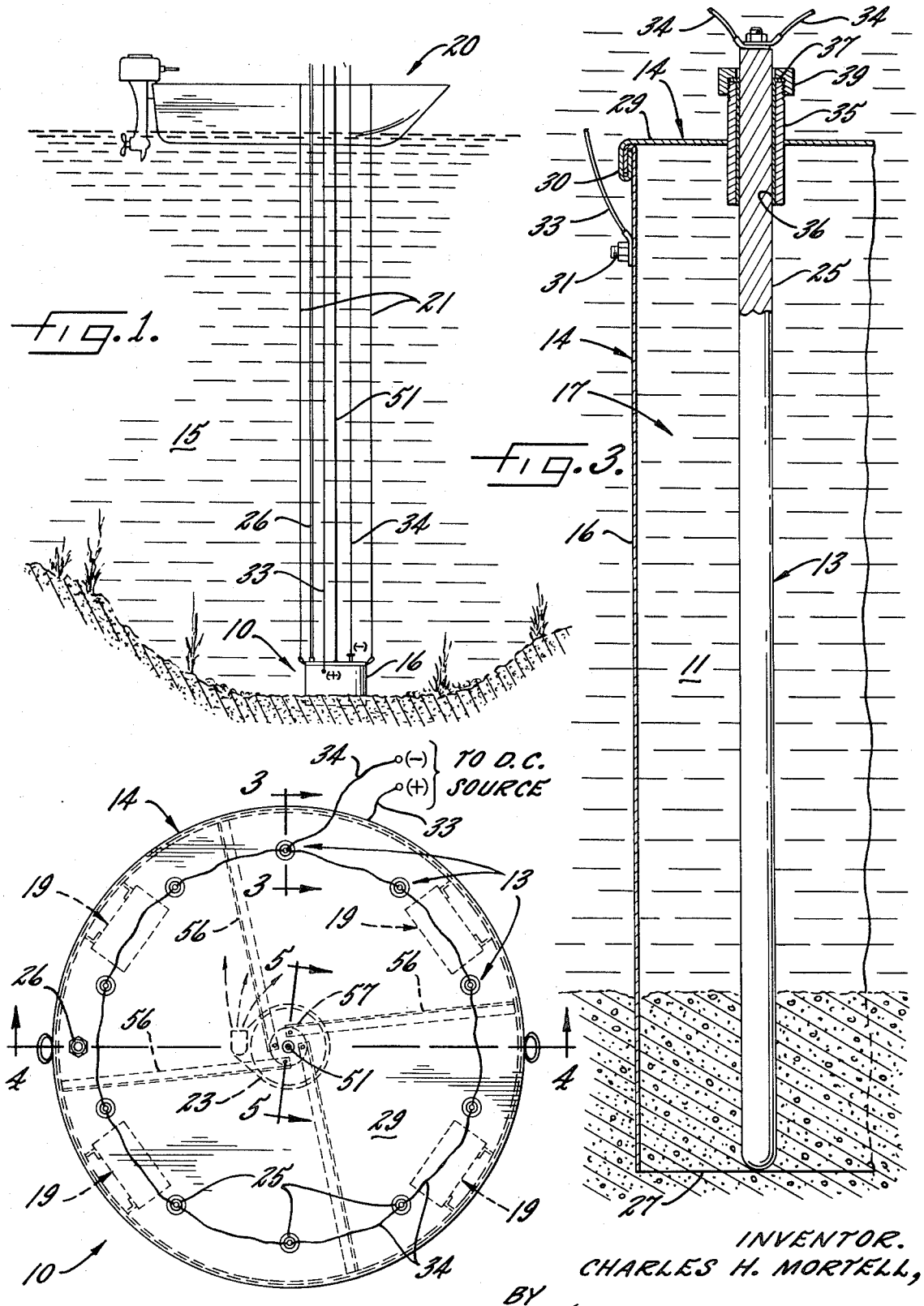

METHOD AND APPARATUS FOR ELECTROLYTICALLY RECOVERING METALS

BACKGROUND OF THE INVENTION

This invention relates to electrolytic depositors of the type adapted to recover valuable or precious metals such as gold, silver or mercury by chemically treating an aqueous solution containing the metal to increase the conductivity of the solution so that it becomes a suitable electrolyte and, thereafter, applying a direct current, electric potential between positive and negative electrodes immersed in the solution to cause electron flow between the electrodes so that a deposit of a selected metal forms on the negative electrode or cathode.

SUMMARY OF THE INVENTION

The general object of the present invention is to provide a new and improved electrolytic depositor of the foregoing general character which is particularly adapted to be submerged within a body of water, such as a stream, and operated to recover a metal such as gold settled on the stream bed.

A further object is to provide a depositor which is adapted to lodge in the stream bed to form a closed chamber in which water and a portion of the bed are captured. An associated object is to provide means within the chamber for treating the captured water and bed so they become electrically conductive such that when an electric potential is applied between the electrodes electrons flow to the cathode and deposit the metal.

A more detailed object is to provide a device which is operable to draw material including the metal to be recovered from the stream bed and circulate it within the depositor to increase the quantity of metal recovered.

Another important object is to provide a depositor which is portable so that it may be moved easily from place to place on the stream bed.

The invention also resides in the novel manner of recovering the metal directly from the bed of the body of water.

Other objects and advantages will become apparent from the following detailed description when taken in conjunction with the accompanying drawings.

BRIEF DESCRIPTION OF THE DRAWINGS

FIG. 1 is an elevational view of a depositor embodying the novel features of the present invention showing the depositor lodged in the bed of a stream and being operated from a boat to electrolytically recover metals from the stream bed.

FIG. 2 is an enlarged plan view of the depositor shown in FIG. 1.

FIG. 3 is an enlarged fragmentary cross-sectional view taken substantially along line 3—3 of FIG. 2.

DETAILED DESCRIPTION OF THE PREFERRED EMBODIMENT

Figure 4:
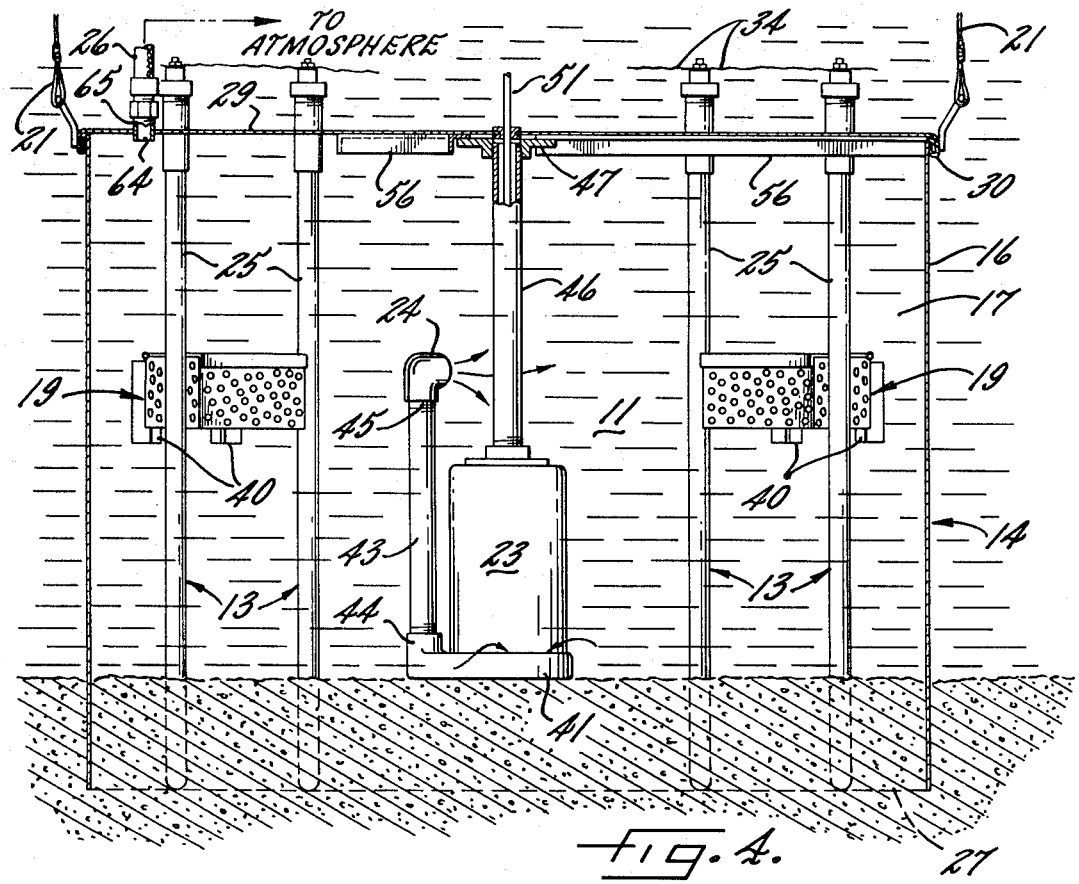
FIG. 4 is an enlarged cross-sectional view taken substantially along line 4—4 of FIG. 2.

As shown in the drawings for purposes of illustration, the invention is embodied in a depositor 10 for electrolytically recovering metals dissolved, suspended or deposited in an electrically conductive solution called an electrolyte 11. Electrolytic recovery of metals is accomplished by the application of a direct-current, electric potential between electrodes immersed in the electrolyte. During electrolysis, positively and negatively charged ions, respectively accept and give-up electrons at the electrodes to maintain a state of balance in the electrolyte by offsetting the effect caused by the application of the direct current. The positively charged ions, usually the metal ions, are drawn to a negative electrode or cathode 13 and accept electrons sufficient to reduce the ion to its metallic form which plates on the cathode. The negatively charged ions, on the other hand, are drawn to a positively charged electrode or anode 14 to give-up sufficient electrons to transform the ion into its normal molecular state which is usually gaseous in nature. After a sufficient quantity of metal has plated on the cathode, the latter can be removed from the electrolyte and the metal scraped from the cathode. Thus, when metals are recovered by using an electrolytic process, the ions in the electrolyte, in effect, carry the electric current through the electrolyte to the electrodes by accepting electrons and plating at the cathode, and giving-up electrons and being driven off as a gas at the anode.

In electrolytic plating, a metal present in the electrolyte 11 accumulates at the cathode 13 according to that metal's tendency to accept electrons. This tendency is directly related to the conductivity of the electrolyte and the voltage applied between the electrodes. The conductivity of the electrolyte solution depends upon the concentration of ion radicals in the solution because it is these radicals that accept and give-up electrons to cause an electron flow between the electrodes. Since salts tend to disassociate into their ion radicals when dissolved in water, the addition of a salt to water necessarily increases the conductivity of the electrolyte. Thus, by dissolving a salt in the electrolyte and applying the proper voltage potential between the electrodes of a depositor containing a selected metal to be recovered, the metal deposits on the cathode of the depositor. For instance, to recover gold, either of the salts zinc chloride, magnesium chloride or potassium cyanide added to water will enable sufficient quantities of electrons to flow through the resulting solution, upon the application of a selected voltage potential, and cause any gold contained in the solution to deposit on the cathode. For this purpose, a current or electron flow in the range of 10 to 15 amperes per square inch of cathode surface area results in a depositing of gold from the electrolyte onto the cathode. To facilitate the removal of the gold from the cathodes and accelerate the initial depositing of the gold, a film of mercury may be placed on the cathode.

In accordance with the primary aspect of the present invention, the depositor 10 is adapted to operate under the surface of a body of water 15 such as a stream to electrolytically recover precious metals that have settled in various locations on the stream bed. For this purpose, the depositor includes a submersible housing 16, at least one anode 14 and at least one cathode 13, both of which are contained within the housing. The latter is operable, when lowered through the water, to lodge within the stream bed to define a chamber 17 captivating a quantity of the stream's water adjacent the bed in addition to a portion of the bed itself. A means 19 (FIG. 4) operates to deposit a chemical within the chamber to ionize the captivated water and bed to create the electrolyte solution 11 through which electrons can flow. Thereafter, the material in the captivated bed is circulated throughout the chamber to mix the electrolyte thoroughly with the precious metals present such that, as a direct current, voltage potential is applied between the anode and cathode, substantially all of the metal present plates out on the cathode. When the supply of the metal is exhausted at one location in the stream bed, the depositor may be lifted from the bed and easily transported to another location. Thus, the present invention provides a simple and effective instrument which is adapted to efficiently and economically recover gold or any other desired metal directly from the bed of a body of water.

To recover a metal directly from the bed of a stream, the depositor 10 is transported by means of a boat 20 or other suitable water vehicle (FIG. 1) to a selected position above a desired location on the bed and is lowered by two nylon lines 21 through the water to lodge in the stream bed captivating a quantity of water and bed in the chamber. In the present instance, ionization of the captivated water and bed is effected by the dissolution of the disassociating chemical, zinc chloride, which is contained within the depositing means, herein, four perforated boxes or sieves 19 mounted on the housing wall within the chamber 17. The dissolution of the zinc chloride is accelerated by a flow of the captivated water and material expelled by an agitator in the form of an electrically operated sump pump 23 connected to the top of the housing and resting within the chamber on the stream bed. The flow is directed out of a nozzle 24 positioned in the center of the chamber in a circular path through the chamber thoroughly mixing the zinc chloride and water into the electrolyte solution 11 which is suitable to conduct electron flow between the anode and cathode upon the application of the direct current, electric potential. Once the latter is applied, the electron flow between the electrodes quickly ionizes any of the metal present in the circulating material and causes it to plate out or deposit on ten rods 25 extending into the chamber and serving as the cathodes 13 while gases driven out of the electrolyte rise through a hose 26 connected to the top of the housing and leading to the surface to vent in the atmosphere. After the supply of the metal present in the bed is recovered, the depositor may be raised to the surface to remove the cathode rods and collect the deposited metal.

More specifically, the depositor housing 16 is formed in the shape of a thin-walled, copper cylinder with its bottom end 27 open and its upper end closed by a circular copper lid 29. The latter is fastened to the housing by means of a watertight, interlocking double seam 30 (FIG. 3) which is formed at the periphery of the lid integrally with the top edge of the housing wall to reduce the loss or dilution of the electrolyte 11 within the chamber 17 during electrolysis. Mounted on the outside wall of the housing is an electrical connector 31 (FIG. 3) receiving a lead 33 which connects the housing with a direct current source electrical energy (not shown). Thus, the housing, including both the cylinder and lid, serves as the anode 14 of the depositor 10.

Extending through the lid 29 into the housing chamber 17 and terminating even with the bottom edge of the housing wall are the ten cathode rods 25 (FIGS. 2 and 3) which are angularly spaced from each other inwardly of the periphery of the lid. Preferably, the cathode rods are made of carbon, carbon steel or copper and are electrically interconnected with each other through a wire 34 which also serves to connect one of the rods to the negative side of the direct current, energy source (see FIGS. 2 and 3). Consequently, when the depositor 10 is lowered into the water 15 to lodge into the bed, a portion of the ends of the rods sticks into the bed to the same extent as the housing wall. Thus, with the depositor activated, an electric potential also exists through a portion of the bed to help ionize metal particles found therein.

To mount the cathode rods 25 within the chamber 17, the lid 29 includes ten cylindrical collars 35 (FIG. 3) which extend longitudinally through and are welded to the lid in positions angularly spaced from each other inwardly of the periphery of the lid. Telescoped into each of the collars is an insulating sleeve 36 which includes an outwardly projecting annular flange 37 fitting over the top of the sleeve to electrically insulate the cathode rods from the anode 14 and thereby prevent short circuits within the depositor 10. Each sleeve is held within one of the collars by an open-ended cap 39 (FIG. 3) threaded over the top of the collar to engage the flange and squeeze it against the top of the collar. The rods 25 are telescoped through the sleeves in a watertight engagement therewith and extend into the chamber and are adjustable within the latter by loosening the cap, grasping the outer exposed portion of the rod and pulling thereon to select the length of the rod projecting into the chamber. Similarly, the rods may be removed for scraping to recover metals deposited thereon. Thus, the rods are mounted through and connected to the lid in a watertight and electrically insulated manner to project into the chamber for the electrolytic recovery of the metal.

To chemically treat the water trapped within the chamber to increase its conductivity, the four sieves 19 are mounted by brackets 40 on the inner wall of the chamber. The sieves are angularly spaced from each other and located in a horizontal plane intersecting the approximate center of the chamber as illustrated in FIGS. 2 and 4. Zinc chloride placed within the sieves is preferred over other chemicals, such as potassium cynide, because the electrolyte thus created will not act as a pollutant when released into the stream.

To accelerate the ionization of the metal present in the stream bed by dissolving and mixing the zinc chloride throughout the chamber 17, the pump 23 sucks in water and material from the stream bed through intake ports (not shown) in the lower base portion 41 of the pump. The sucked-in water and material is pumped out into the chamber through an upstanding tube 43 which is connected by its lower end to a threaded orifice 44 in the base of the pump and extends upwardly therefrom paralleling the pump to an upper end 45 positioned in the central portion of the chamber (FIG. 4). Fastened on the upper end is the nozzle or elbow 24 which directs the flow of material and water in a circular path through the chamber.

The pump 23 is carried on the end of a pipe 46 which is connected to the lid 29 by means of a circular support plate 47 (FIG. 5) with an integrally formed, internally threaded sleeve 49 extending into the chamber 17 to have the upper end 50 of the pipe threaded into it. Running through the center of the pipe and connected to the pump is an electric cord 51 which carries an alternating current from an energy source (not shown) to the pump. The cord enters the pipe through an aperature 53 in the center of the lid, the aperature being sealed by a watertight rubber grommet 54 sandwiched around the lid at the periphery of the aperature and surrounding the cord.

Figure 5:
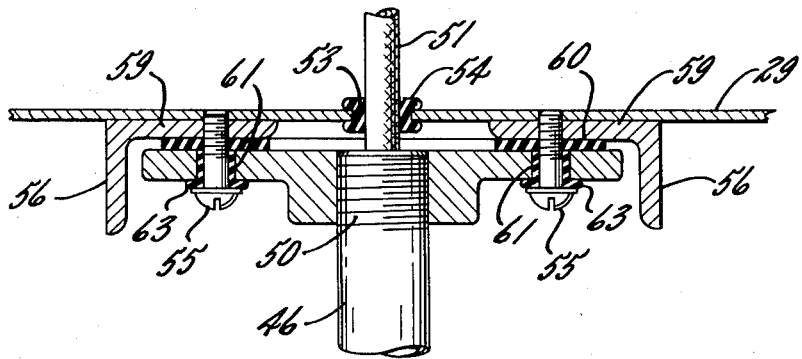
FIG. 5 is an enlarged fragmentary cross-sectional view taken substantially along the line 5—5 of FIG. 2.

The plate 47 is fastened by screws 55 to four angle-irons 56 each of which is welded to the inside surface of the lid 29 and extends to the periphery thereof from an end 57 angularly spaced from the other irons and tangentially of a defined circular area in the central portion of the lid as shown in FIG. 2. The angle-irons give additional support to the lid to prevent the latter from denting inwardly under the weight of the pump 23. The screws are threaded into an angle-iron leg 59 which fits flat against the lid, as shown in FIG. 5, to space the plate from the lid. Located between the plate and the angle-irons is a ring-shaped gasket 60 electrically insulating the plate, pipe and pump from the lid. A short circuit through the screws is prevented by a rubber grommet 61 inserted into each of the screw holes around the screws. An end portion 63 of each grommet overlaps the edge of the hole to act as an insulating washer for the head of the screw.

To provide a vent for the gases collecting at the anode 14 during electrolysis, the lid includes an opening 64 (FIG. 4) with a threaded hose coupling 65 mounted around the opening which is adjacent the periphery on the outer surface of the lid 29. The hose 26 is connected to the coupling and leads to the water's surface providing an atmospheric vent for the gases driven out of the electrolyte during the depositing process.

It will be observed from the above that the present invention provides an electrolytic depositor 10 of new and novel construction and one which can be used in a new and novel manner to recover precious metals directly from the bed of a stream in an economic and efficient operation. This is accomplished by lodging the depositor in the bed of the stream in the desired location to trap a quantity of water and bed which is treated with zinc chloride thus creating the electrolyte solution 11 for the electrolytic recovery of any metal found in the bed contained within the chamber. After all the metal at one location has plated on the cathode rods 25, the depositor can be easily transported to another location in the bed and the process repeated.

I claim as my invention:

1. An electrolytic depositor for removing metals from the bed of a body of water, said depositor comprising a submersible housing with a closed top end and sidewalls and an open bottom end, said housing being operable when dropped into the body of water to lodge by its sidewalls in the bed forming a chamber containing water and a portion of the bed, said depositor including at least one anode communicating with the interior of said housing, means for connecting said anode to a source of direct-current electrical energy, at least one cathode disposed within said housing and electrically insulated from said anode, means electrically connecting said cathode with said source of electrical energy, means supporting said cathode within said housing whereby the cathodes form depositors for collecting the metals when a suitable electric potential is applied between said anode and the cathodes, an agitating means operable to stir material containing the metal loose from the bed to circulate within said chamber, and a chemical depositing means operable to deposit chemicals within said chamber to increase the conductivity of the water contained within said chamber.

2. A depositor as defined in claim 1 in which said housing is the anode.

3. An electrolytic depositor for removing metals from the bed of a body of water, said depositor comprising a submersible housing with a closed top end and sidewalls and an open bottom end, said housing being operable when dropped into the body of water to lodge by its sidewalls in the bed forming a chamber containing water and a portion of the bed, means for connecting said housing to a source of electrical energy whereby said housing constitutes the anode of the depositor, a plurality of cathodes disposed within said housing, means electrically interconnecting said cathodes with each other and connecting one of said cathodes to said source of electrical energy, means supporting said cathodes within said housing while electrically insulating the cathodes from the housing whereby the cathodes form depositors for collecting the metals when a suitable electric potential is applied between said anode and the cathodes, an agitating means operable to stir material containing the metal loose from the bed to circulate within said chamber, and a chemical depositing means operable to deposit chemicals within said chamber to increase the conductivity of the water contained within said chamber.

4. A depositor as defined by claim 3 wherein said agitating means comprises a pump for sucking material containing the metal from the bed and expelling the material in the upper end of the chamber so that it circulates through the chamber, said pump being suspended within said chamber and connected to a suitable energy providing means which is operable to activate said pump.

5. A depositor as defined by claim 3 wherein said cathodes are elongated vertical rods and the lower ends of said cathodes terminate within said chamber at a position even with the bottom edge of said sidewalls to lodge within said bed.

6. A depositor as defined by claim 5 wherein said supporting means detachably connects said cathodes to said top to permit the cathodes to be easily removed to strip deposited metal therefrom.

7. A depositor as defined in claim 3 including means communicating between said chamber and the atmosphere above the body of water to permit gases to escape from said chamber.

8. A method of recovering metals contained in material on the bed of a body of water, said method comprising the steps of submerging an electrolytic depositor in the body of water, said depositor including at least one positive electrode and at least one negative electrode, drawing material containing the metal to be removed from the bed, circulating the material within the depositor, applying a chemical to increase the conductivity of the water and cause dissolved metal to deposit on the negative electrode upon the application of a suitable electric potential, and applying a suitable electric potential to the depositor to draw the metals to the negative electrode from the water and the material on the bed.

9. The method as defined in claim 8 wherein the depositor includes a housing, one of said electrodes being a portion of said housing, and the circulating of said material being done within said housing.

* * * * *